United States Patent [19]
Barten et al.

[11] Patent Number: 5,605,274
[45] Date of Patent: Feb. 25, 1997

[54] CONTROLLED ATMOSPHERE BRAZE FURNACE WITH FREE PART ENTRY

[75] Inventors: Brian L. Barten, Lockport; Shrikant M. Joshi, Getzville, both of N.Y.

[73] Assignee: General Motors Corporation, Detroit, Mich.

[21] Appl. No.: 556,330

[22] Filed: Nov. 13, 1995

[51] Int. Cl.$^6$ ........................................... B23K 3/00
[52] U.S. Cl. ................... 228/42; 228/8; 432/72; 110/210
[58] Field of Search .................... 228/8, 42, 102, 228/219; 431/328; 432/72; 110/186, 187, 203, 210

[56] References Cited

U.S. PATENT DOCUMENTS

| | | | |
|---|---|---|---|
| 4,772,498 | 9/1988 | Bertin et al. | 428/36 |
| 4,927,359 | 5/1990 | Hitch | 432/206 |
| 5,156,325 | 10/1992 | Mishina et al. | 228/42 |
| 5,172,847 | 12/1992 | Barten et al. | 228/18 |
| 5,172,849 | 12/1992 | Barten et al. | 228/18 |
| 5,322,209 | 6/1994 | Barten et al. | 228/183 |
| 5,341,978 | 8/1994 | Halstead et al. | 228/42 |

OTHER PUBLICATIONS

ASM, "Welding and Brazing", *Metals Handbook,* vol. 6, 8th ed., 1971.
ASM, "Heat Treating", *Metals Handbook,* vol. 4, 9th ed., 1981, pp. 361–377.
IBM Technical Disclosure Bulletin, "Reducing Inert Gas Consumption in a Reflow Furnace", vol. 34, No. 3, Aug. 1991, pp. 415, 416.

*Primary Examiner*—Samuel M. Heinrich
*Attorney, Agent, or Firm*—Patrick M. Griffin

[57] ABSTRACT

A vestibule for part entry or exit from a flow through type of braze furnace in which no substantial physical barrier is necessary to prevent air exchange between the vestibule and the outside. A controller burner within the vestibule continually burns oxygen that does leak in, sensing whether combustion is complete trough the use of an analyzer in an exhaust stack. In addition, a neutral gas injector within the vestibule chamber maintains a near net zero pressure balance in order to minimize, though not prevent, ingress leakage. Parts can therefore enter the door freely without dragging through the impediment of a physical barrier.

2 Claims, 3 Drawing Sheets

CONTROLLED ATMOSPHERE BRAZE FURNACE WITH FREE PART ENTRY

This invention relates to braze furnaces in general, and specifically to braze furnaces of the type in which metal workpieces are brazed in an oxygen free atmosphere.

BACKGROUND OF THE INVENTION

Heat exchangers such as automotive condensers and evaporators are typically brazed aluminum parts, in which constituent components covered with a braze layer are run through a braze furnace. The furnace melts the braze layer which, when liquid, is drawn by capillary action into various narrow component interfaces, later cooling and hardening to create a solid part. This process works well only if the inside of the braze furnace and the internal atmosphere surrounding the part can be kept substantially oxygen free, typically to within only a few parts per million. Clearly, some means must be found to prevent the leakage of oxygen rich, outside air into the furnace. Just as clearly, the inside of the furnace must, at least at some point, be open to the outside for the entry of, and removal of, workpieces.

The simplest approach to outside air exclusion is not the most productive. In so called batch processing, a discrete number of workpieces are placed in the furnace, which is then sealed off and evacuated. When finished, the doors are opened and the parts removed. Another batch processing system does not use a vacuum, but instead injects an inert atmosphere of nitrogen to purge the outside air after the doors are closed. Batch processing of whatever kind is clearly inferior, in terms of parts per hour, to a system in which parts can be run continually through the furnace, with no stopping or starting to open or close doors. A flow through process, on the other had, presents the dilemma that the furnace must be continually open to the outside, providing a constant leak path for oxygen into the furnace.

Known flow through furnaces, such as that shown in co assigned U.S. Pat. No. 5,172,847, exclude most outside air by injecting inert gas, typically nitrogen, into the furnace interior, creating an always positive pressure balance that sacrificially leaks through the vestibule openings continually. In an attempt to at least reduce the rate of sacrificial leakage and the rate of expensive nitrogen usage, barrier "curtains," depending strips of flexible stainless steel, are hung at the open vestibule doors. These continually drag over the parts flowing past on the conveyer, impeding their progress in addition to impeding air exchange. The curtains inevitably wear with use, and are expensive to replace. In addition, they limit the number of designs possible for the parts themselves, obviating the use of protruding pipes or the like that might catch and grab on the curtain.

SUMMARY OF THE INVENTION

The invention provides a braze furnace with workpiece entry or exit vestibules that are continually open and physically unrestricted, so that workpieces can be continually fed in or out of the furnace without impediment or physical contact. Outside air and its attendant oxygen are excluded not by a physical barrier, but by a twofold approach of inert gas injection combined with a controlled, stoichiometric combustion process to continually scrub oxygen from the vestibule.

In the embodiment disclosed, each vestibule includes a chamber that opens on one side to the furnace, either to send workpieces to or to receive workpieces therefrom, and opens on the other side to the outside air through a simple door. The door has no significantly physically impeding closure or barrier in it. A conveyor runs through the vestibules' doors and the furnace, freely carrying a steady flow of workpieces, clearing the edges of the door, but also potentially allowing free leakage of outside air.

To prevent outside air contamination from vestibule to furnace, two mechanisms are provided. First, each vestibule has an inert gas injector, nitrogen as disclosed, which continually adds enough inert gas to the interior of the vestibule to create a near zero net pressure balance relative to the outside air. This blocks the flow of most outside air through the door. However, unlike previous systems, the inert gas flow is not great enough to spill continually from the doors in a high rate sacrificial leakage. This economizes greatly on the inert gas used, but inevitably allows some inward leakage of outside air and oxygen. To deal with the outside air leakage that does occur, the vestibule contains a natural gas burner with controllable flow rate, located above the conveyor and beneath an exhaust stack. In the stack, above the burner, an exhaust gas analyzer measures the level of combustion products in the exhaust gas, specifically the level of $CO_2$ and $CO$. Natural gas has a known stoichiometric burning profile. This means that a predetermined ratio of fuel to air is known, as a function of given percentages of the products of combustion, that will produce near perfect or complete combustion. The sensed level of $CO_2$ and/or $CO$ is therefore used to indicate whether complete combustion is in fact occurring. While the flame is burning, if it is sensed that combustion of the oxygen present is incomplete, more gas is fed to the flame. If the converse is true, and more gas is being fed to the flame than necessary, it is modulated back. Should the flame go out altogether from lack of oxygen, a flame sensor so indicates, and an extra outside duct can be opened to deliberately feed enough outside air directly in to re light the flame.

DESCRIPTION OF THE PREFERRED EMBODIMENT

These and other features of the invention will appear from the following written description, and from the drawings, in which.

Figure 1:
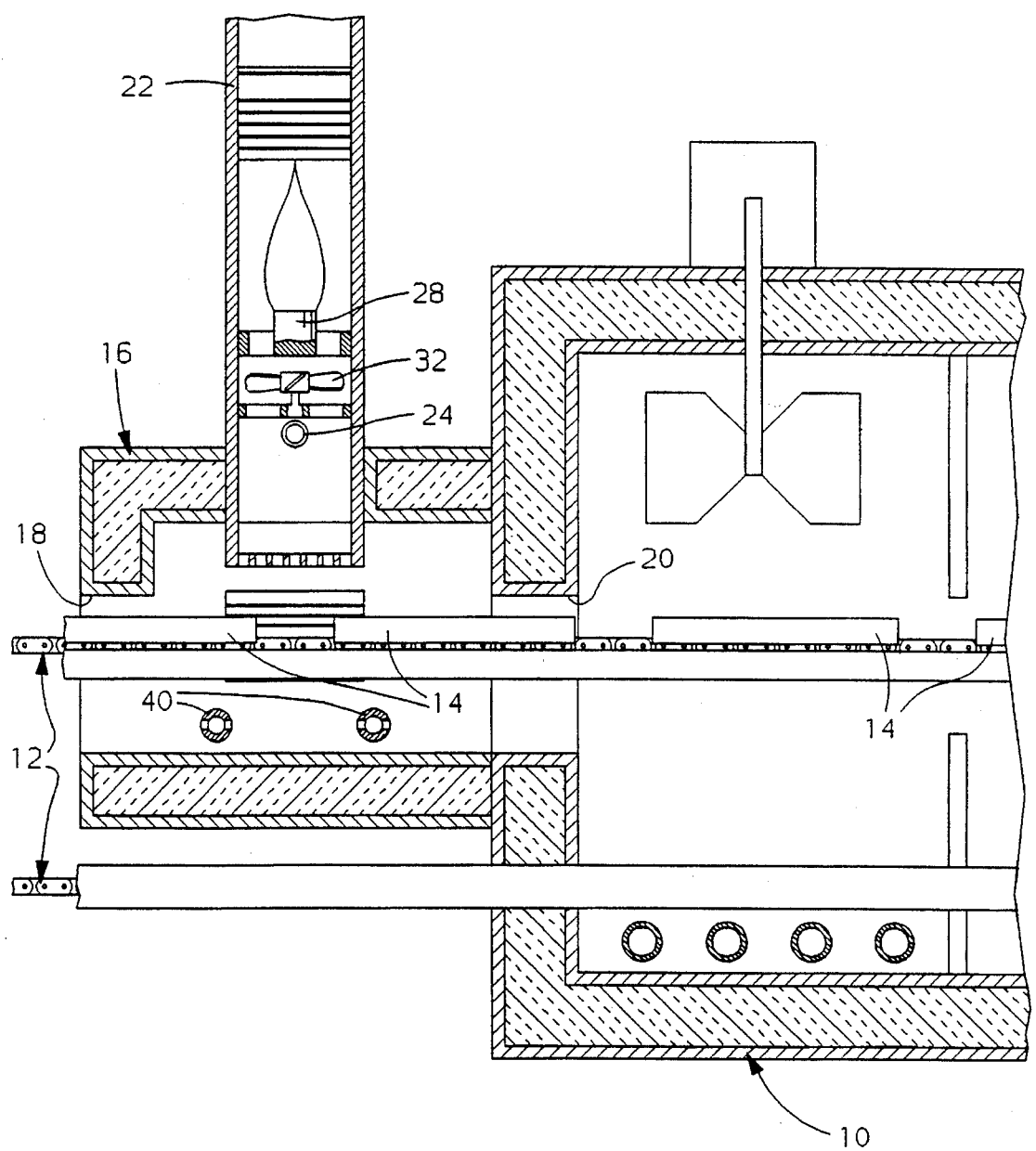
FIG. 1 is a cross section through an entry vestibule made according to the invention, taken in the direction along which workpieces travel.
Figure 2:
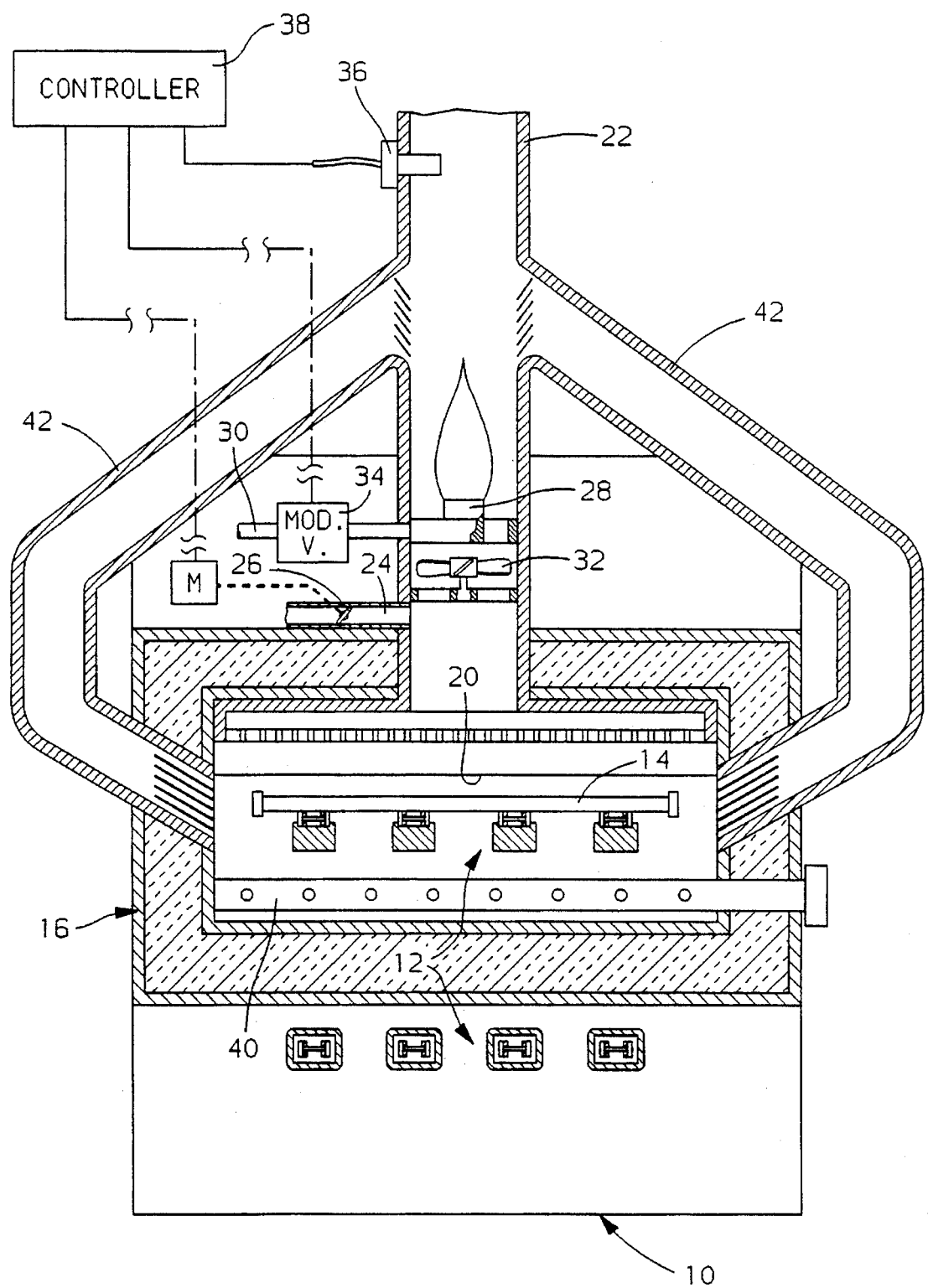
FIG. 2 is a cross section taken 90 degrees to that in FIG. 1.

Referring to the FIGS. 1 and 2, a conventional braze furnace 10 contains a continuous part conveyor 12 that carries workpieces 14 continually through it. The workpieces 14 could be metal heat exchangers, such as aluminum condensers, or any other workpiece of the type in which the metal surfaces are clad with a braze layer. Such braze layers must be melted and re solidified in an atmosphere that is substantially oxygen free in order to obtain good bonds. In order to obtain substantial oxygen exclusion without physically impeding the physical entry of parts to the furnace 10, an entry vestibule is provided, indicated generally at 16, which includes a novel means for cleansing the interior atmosphere of oxygen. Vestibule 16 is basically a chamber similar to, but smaller than, furnace 10, located at the front of furnace 10 and in line with the conveyor 12. At the front of vestibule 16, a door 18 surrounds the conveyor 12 with just enough clearance that workpieces 14 can pass freely through it without contact. Door 18 has no closure or air excluding device at all, as shown. Door 18 could be provided with a simple and non impeding air excluder, such as a thin, flexible curtain made of a heat resistant material, which would harmlessly wipe over the workpieces 14 passing through it. This is to be contrasted with the current air excluder made up of multiple layers of depending stainless steel strands which drag over the moving parts, and which can substantially interfere with their movement. Basically, however, door 18 would be open and unimpeded, as compared to current practice. Vestibule 16 has two other main openings, a simple passage 20 opening into the main chamber of furnace 10, and an exhaust stack 22 opening to the outside through the top of vestibule 16 from an area above the workpieces 14. In addition, in the embodiment disclosed, an auxiliary outside air duct 24 opens within stack 22 and can be opened or closed by a motorized butterfly valve 26, for a purpose described below. Normally, extra openings such as exhaust stacks and outside air ducts would not exist in an entry vestibule, which would have only the part entry door.

Still referring to FIGS. 1 and 2, several components within the exhaust stack 22 would also not be normally associated with a part entry vestibule. A gas fired burner 28, which burns natural gas or other similar combustible gas fed through a feed line 30, is located within stack 22, above conveyor 12, and also above a combustion air inlet blower 32. Burner 28 is a commercially available assembly that would include several conventional components not separately illustrated. These would include a conventional rod type flame sensor to indicate if a flame is in fact burning, an electronic ignition to re light it if not, and a valve to proportionally mix the correct level of combustion air from beneath with the particular flow of gas being fed to the burner 28. That flow of gas would, in turn, be determined by a motor driven gas modulator indicated schematically at 34. Above the burner 28, fairly high within the stack 22, is a gas analyzer 36 capable of measuring the products of combustion produced by the burner 28. Analyzer 36 is a commercially available sensor capable of measuring percentage levels of $CO_2$ and CO in the sampled gas stream passing by it. Most of the above mentioned components, including butterfly valve 26, burner 28 (the flame sensor therein), gas modulator 34, and analyzer 36 are connected to a computer controller 38 that is programmed to read and operate as described further below. In addition, in the embodiment disclosed, an inert gas injector 40 is located below the conveyor 12 within the chamber of vestibule 16. Injector 40 continually admits nitrogen gas within the interior volume at a flow rate sufficient to create a substantially neutral pressure balance relative to the outside across door 18. This alone serves to exclude much oxygen. However, the injected neutral gas stream, in the invention, need not be so great as to continually leak out of door 18 at a substantial rate. Finally, heat return ducts 42 open from the sides of stack 22, just above burner 28, back beneath conveyor 12 so as to return heat from the flame, for a purpose described below.

Figure 3:
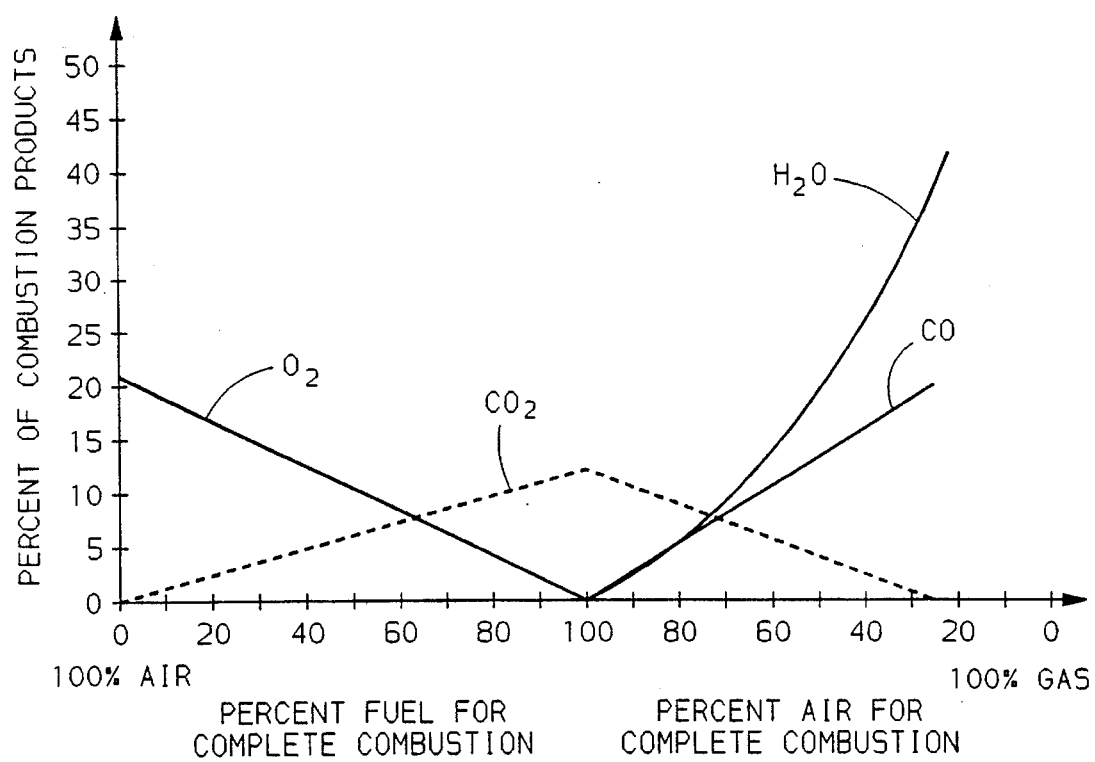
FIG. 3 is a graph of the percentage of combustion products versus various percentages of gas and air for a typical commercial gas burner.

Referring next to all of the Figures, the operation of the invention is described. Initially, with the door 18 open, some outside air with a full normal percentage of oxygen can enter, since injector 40 is not intended to exclude it all. The control scheme embedded within controller 38 would first determine whether a flame was burning in burner 28, which, at the very beginning, it would not. Controller 38 would then provide enough gas through modulator 34 to light burner 28 with the electronic ignition, and to feed combustion air from the chamber up to it with blower 32. The butterfly valve 26 remains closed. At that point, with a flame burning, controller 38 rams to reading the level of combustion products leaving stack 22. So long as the level of $CO_2$ is less than the peak level in FIG. 3, which is the near complete combustion point when all available oxygen will have been burned, then the gas modulator 34 increases the gas flow incrementally until it is. Should the gas flow rate become too high for the available oxygen, to the right of the peak $CO_2$ point in FIG. 3, then CO will begin to be formed and detected. The modulator 34 would throttle the gas flow rate back again. Again, the burner 28 is inherently designed to pull in a proper flow of surrounding combustion air, continually fed to it by blower 32, a combustion air flow that is proportional to the particular gas flow being fed to it at any point.

Once the burner 28 has run for a time sufficient to establish a basic equilibrium and reduce the oxygen level, the conveyor 12 may be started up to pull workpieces 14 into the vestibule 16 through door 18. Since the heat return ducts 42 are heating an area of conveyor 12 below the burner 28, a possible parameter to monitor would be the temperature in that area. The conveyor 12 could be started when the temperature was high enough to pre heat the workpieces 14 to some desired level. Again, the workpieces 14 will begin entering with substantially no impediment within door 18. It will be recalled that neutral nitrogen is continually being fed in by the injector 40, but some outside oxygen will inevitably be dragged in. It will be continually monitored, indirectly at least, by the analyzer 36 and the gas flow rate is continually adjusted by the controller 38 and modulator 34 so as to keep the oxygen level in the chamber minimal. Little or none will reach the main chamber of the furnace 10, therefore. Should so little oxygen be present within vestibule 16 that the flame in burner 28 goes out, then it's internal flame sensor would detect that, and the controller 38 would switch to an independent control scheme designed to open the butterfly valve 26 and admit enough outside air through duct 24 to get the flame re lit. The outside air is admitted below the burner 28, but this is high enough within stack 22, which has a constant upward flow, that it should not cause leakage into the chamber of vestibule 16 as such. It is anticipated that with a constant flow rate of conveyor 12, and with other conditions being relatively constant, that this would not be a frequent occurrence.

Variations in the disclosed embodiment could be made. The same vestibule could be used as a part exit vestibule, although the heat return ducts 42 would not likely be necessary, since that is the point where the workpieces 14 would be cooled, not pre heated. In a design where outside air leakage was great enough that it was not likely that the burner 28 would ever lack for enough oxygen to stay lit, the outside air duct 24 could be eliminated. As noted, it is not contemplated that it would come into play frequently in any case. The heat return ducts 42 would not be needed if the furnace 10 were able to bring the workpieces 14 up to temperature with no need for pre heat. Therefore, it should be understood that it is not intended to limit the invention to just the embodiment disclosed.

We claim:

1. A vestibule for transporting workpieces continually into or out of the substantially oxygen free internal environment of a braze furnace without the necessity of an outside air excluder of the type that also physically impedes the entry or exit of workpieces to or from said vestibule, comprising, a chamber that is open on one side to said braze furnace, open on the opposite side to the outside air through an open door, and open at the top to the outside air through an exhaust stack, a transport mechanism to continually carry workpieces through said chamber and freely through said open door without physical contact with said door, a combustible gas burner within said chamber, below said exhaust stack, for burning gas in conjunction with any outside oxygen present within said chamber, said combustible gas having a known stoichiometric combustion profile that is measurable in terms of sensible levels of exhausted gaseous combustion products, a modulator mechanism for controlling the rate of gas fed to said burner, an analyzer for measuring the level of combustion products in said exhaust stack, above said burner, to sense whether true stoichiometric combustion has been achieved, and, a controller programmed to continually increase or decrease the rate of gas feed to said burner in response to the level of exhausted gaseous combustion products measured by said analyzer, whereby, workpieces may continually travel through said chamber open door without physical impediment while oxygen entering with outside air leakage is substantially removed by combustion before reaching said braze furnace.

2. A furnace vestibule according to claim 1 further characterized in that said vestibule chamber also includes an inert gas injector that continually injects inert gas into said chamber at a rate sufficient to create a substantially neutral pressure balance within said chamber relative to the outside air and thereby minimize the leakage of outside air through said open door as said workpieces travel through it.

* * * * *